United States Patent Office 2,980,716
Patented Apr. 18, 1961

2,980,716

METHOD FOR PREPARING 6,8-DIHALO-OCTANOIC ESTERS

Lester J. Reed, Austin, Tex., assignor to Research Corporation, New York, N.Y., a corporation of New York No Drawing. Filed June 11, 1954, Ser. No. 436,255

2 Claims. (Cl. 260—408)

This invention relates to intermediates useful in the production of lipoic acid and to method of making them. It particularly relates to 6,8-dihalooctanoic acids of the general formula $$HalCH_2CH_2CHHal(CH_2)_4CO_2H$$

wherein Hal represents chlorine or bromine and the alkyl or aralkyl esters thereof.

The 6,8-dihalooctanoic acids and their esters may be made in a variety of ways from 8-chloro-6-oxooctanoic acid esters, and can be converted into α-lipoic acid by reaction with organic thiol compounds to 6,8-dithiolethers or esters of octanoic acid which are then hydrolized to 6,8-dithioloctanoic acid. The latter is readily oxidized to α-lipoic acid.

Referring more particularly to the following equations illustrating the principles of the invention in which R represents an esterifying alkyl or aralkyl group, 8-chloro-6-oxooctanoic esters (I) may be reduced with an alkali metal boron hydride to the 8-chloro-6-hydroxy ester (XII) and the latter converted to the 8-chloro-6-halo compound XIII with a suitable halogenating agent, such as thionyl chloride or phosphorus tribromide.

The 8-chloro-6-oxooctanoic acid ester may be converted to the 6-oxo-7-octenoic ester (II) by heating. The 6-oxo-7-octenoic esters may be converted to 8-bromo-6-oxooctanoic ester (III) by the addition of HBr and further converted to the 6,8-dihalooctanoic ester (V) by reduction of the oxo group to hydroxyl (IV) with an alkali metal boron hydride folowed by treatment with a halogenating agent to replace the hydroxyl with halogen.

The same overall conversion may be accomplished by first reducing the oxo group of the 6-oxo-7-octenoic ester to hydroxyl, hydrolyzing the ester to the free 6-hydroxy-7-octenoic acid (IX), treating with HBr to form the 6,8-dibromooctanoic acid (X) and esterifying the acid.

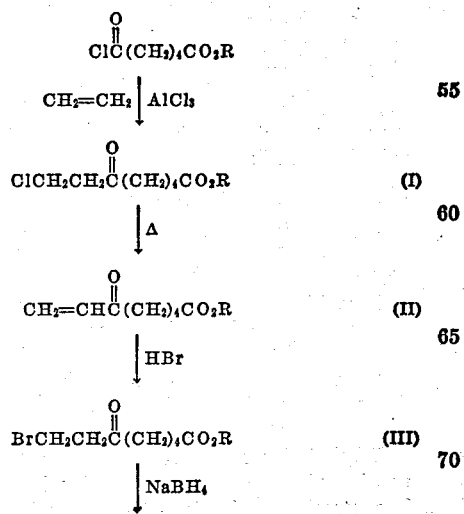

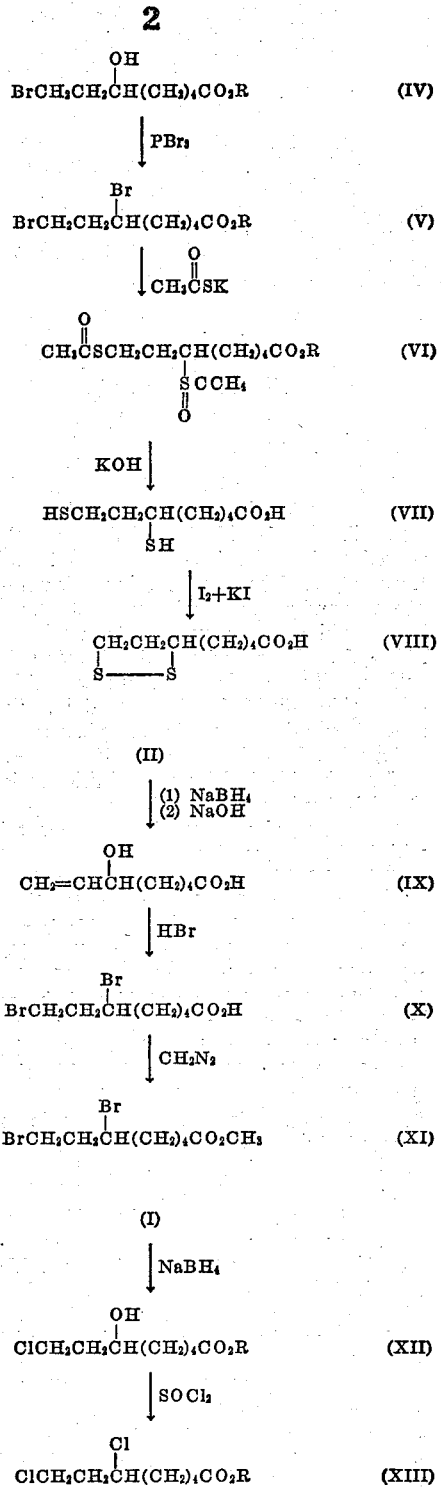

The following examples are illustrative of the procedures useful in producing the intermediates of the invention and converting them to lipoic acid.

*Ethyl 6-oxo-7-octenoate* (II).—To a suspension of 106 g. of anhydrous aluminum chloride in 450 ml. of reagent-grade carbontetrachloride is added dropwise, with vigorous stirring, 70 g. of ethyl δ-chloroformylvalerate (H. Bergs, C. Wittfeld and H. Frank, Ber., 67B, 1622 (1947)). The temperature is maintained at 25° C. The cooling bath is removed and ethylene is passed in for a period of 2 hours. The reaction mixture is poured onto cracked ice, the organic layer separated, and the aqueous layer extracted with 200 ml. of chloroform. The combined organic extracts are dried over anhydrous sodium sulfate and the solvent removed in vacuo. The dark-colored oil remaining, crude ethyl 8-chloro-6-oxooctanoate (I), is distilled in vacuo through a 6 in. Vigreaux column. After small forerun, the main fraction (II), 48–54 g. (72–80%), B.P. 112–114° C. (2 mm.); $n^{25}_D$ 1.4485, is collected.

*Ethyl 8-bromo-6-hydroxyoctanoate* (IV).—A solution of 51.3 g. of ethyl 6-oxo-7-octenoate (II) and 50 ml. of reagent-grade benzene is cooled in an ice-bath and shaken intermittently while anhydrous hydrogen bromide is passed into the solution. When 24.8 g. of hydrogen bromide has been absorbed, the flask is stoppered and allowed to stand at room temperature for 20 hours. The organic solvent is removed in vacuo and the reddish oil, crude ethyl 8-bromo-6-oxooctanoate (III), is dissolved in 200 ml. of 95% ethanol. This solution is maintained at 20° C. while a solution of 5.3 g. of sodium borohydride in 20 ml. of water is added dropwise with stirring (approximately 10 minutes). Forty milliliters of concentrated ammonium hydroxide is added, the cooling bath is removed, and stirring is continued for 30 minutes at room temperature. The reaction mixture is poured into 500 ml. of water and extracted with two 150 ml. portions of ether. The combined ether extracts are washed with 50 ml. of 5% hydrochloric acid and dried over anhydrous sodium sulfate. The organic solvent is removed in vacuo and the oily residue distilled through a 6 in. Vigreaux column. After a small forerun (ca. 5 g.), the main fraction is collected, 40.8–47.5 g. (55–64%), B.P. 132–134° C. (0.5 mm.), $n^{25}_D$ 1.4761; on redistillation it boiled at 132° C. (0.5 mm.), $n^{25}_D$ 1.4767.

Ether may also be used as a solvent in the reaction with hydrogen bromide.

*Ethyl 6,8-dibromooctanoate* (V).—A solution of 86 g. of ethyl 8-bromo-6-hydroxyoctanoate (IV) and 50 ml. of reagenta-grade carbon tetrachloride is maintained below 0° C. while 32 g. of phosphorus tribromide is added dropwise with stirring (approximately 25 minutes). Stirring is continued for 2 hours at 0° and the reaction mixture is allowed to stand at room temperature for 16 hours. At this time the reaction mixture is cooled to 0° and 70 ml. of water is added dropwise with stirring. Two hundred milliliters of ether is added and the mixture shaken in a separatory funnel. The organic layer is washed successively with two 100 ml. portions of 5% sodium bicarbonate solution and 50 ml. of water, and then dried over anhydrous sodium sulfate. The organic solvent is removed in vacuo and the oily residue distilled through a 6 in. Vigreaux column. A small forerun (2–3 g.) is collected, followed by the main fraction, 55.2–59.5 g. (52–56%), B.P. 119–121° (0.5 mm.), $n^{25}_D$ 1.4930; on redistillation, B.P. 119° (0.4 mm.), $n^{25}_D$ 1.4938.

Ether may be used as a solvent in place of carbon tetrachloride.

*DL-α-lipoic acid* (VIII).—Redistilled thiolacetic acid (14.7 g.) is cooled in an ice-bath and neutralized to the phenolphthalein end-point with a 10% solution of potassium hydroxide in ethanol (approximately 135 ml. required). To this solution is added 29 g. of ethyl 6,8-dibromooctanoate (V) and the mixture is stirred and heated under reflux in an atmosphere of nitrogen for 5 hours. The reaction mixture, which contains ethyl 6,8-diacetylmercaptooctanoate (VI), is cooled and 35 g. of potassium hydroxide (85%) is added. The reaction mixture is stirred at room temperature in an atmosphere of nitrogen for 17 hours, then acidified (pH <1) with 6 N hydrochloric acid. Ethanol is removed in vacuo, sufficient water is added to dissolve the inorganic solids and the mixture is extracted with two 150 ml. portions of chloroform. To the combined organic extracts, which contain 6,8-dimercaptooctanoic acid (VII), is added 575 ml. of chloroform and 210 ml. of water. This mixture is stirred vigorously in an atmosphere of nitrogen while sufficient iodoform reagent (R. L. Shriner and R. C. Fuson, "Identification of Organic Compounds," 2nd. Ed., John Wiley and Sons, New York, N.Y., 1940, p. 53) is added dropwise during a 6 hour period to give a permanent brown color. Approximately 185 ml. of iodoform reagent is required. The organic layer is separated, washed with 500 ml. of 1% sodium thiosulfate solution, and then extracted with two 250 ml. portions of 5% sodium bicarbonate solution. The aqueous extracts are acidified (pH <1) with 6 N hydrochloric acid and extarcted with two 125 ml. portions of chloroform. The combined chloroform extracts are dried over anhydrous sodium sulfate and the solvent is then removed in vacuo. The yellow viscous oil remaining solidifies when cooled and scratched. This solid material is extracted with three 300 ml. portions of boiling Skelly B solvent (essentially n-hexane). The combined extracts are seeded with crystalline DL-α-lipoic acid and allowed to stand at room temperature overnight and then in a refrigerator for several hours. Large yellow crystals separate, M.P. 60.5–61.5° C. The yield of product is 10.8–12.3 g. (60–68%). It possesses the characteristic ultraviolet absorption spectrum of α-lipoic acid: λ max. 332, ε max. 144; λ min. 280, ε min. 31. On recrystallizing from Skelly B solvent, M.P. 61–62° C.

*Methyl 6,8-dibromooctanoate* (XI).—A solution of 34.5 g. of ethyl 6-oxo-7-octenoate (II) in 100 ml. of methanol is maintained at 20° C. while a solution of 2.12 g. of sodium borohydride in 25 ml. of methanol is added dropwise with stirring. The reaction mixture is allowed to stand 2 hours at room temperature, and then cooled in an ice-bath. Sodium hydroxide (22.4 g.) is added with stirring. When the sodium hydroxide has dissolved, the cooling bath is removed and stirring is continued at room temperature for 13 hours. The reaction mixture is acidified (pH <1) with 6 N HCl and the methanol is removed in vacuo. The reaction mixture is extracted with two 150 ml. portions of ether. The combined ether extracts are shaken with three 100 ml. portions of 5% sodium bicarbonate solution. The combined bicarbonate extracts are acidified (pH <1) with 6 N HCl and the mixture is extracted with three 100 ml. portions of ether. The combined ether extracts are dried over anhydrous sodium sulfate and the ether is removed in vacuo. Crude 6-hydroxy-7-octenoic acid (IX), 23.3 g., remains as a viscous oil.

To this product is added 350 mg. of benzoyl peroxide and the mixture is saturated with anhydrous hydrogen bromide. The flask is stoppered and allowed to stand at room temperature overnight. The reaction mixture, which contains 6,8-dibromooctanoic acid (X), is dissolved in 200 ml. of ether and washed with three 50 ml. portions of water. An ether solution (340 ml.) of diazomethane, prepared from 34.4 g. of N-nitrosomethylurea (F. Arndt, Org. Syntheses, 2, 461 (1948)) is added slowly in the cold. The reaction mixture is allowed to stand 1 hour at room temperature and then concentrated in vacuo to remove excess diazomethane. The solution is dried over anhydrous sodium sulfate and the ether is removed in vacuo to yield 32 g. of an oily residue, which is distilled in vacuo from a modified Claisen flask. Three fractions are collected: 8.1 g., B.P. 93–98° C. (0.3 mm.); 4.4 g., B.P. 98–113° C. (0.3 mm.); 13.2 g., B.P. 114–118° C. (0.2 mm.), $n^{30}_D$ 1.4927. The third fraction represents a 29% yield of methyl 6,8-dibromooctanoate, based on the amount of ethyl 6-oxo-7-octenoate used; on redistillation, B.P. 110–112° C. (0.1 mm.); $n^{30}_D$ 1.4951.

Methyl 6,8-dibromooctanoate is converted to DL-α-lipoic acid in 64% yield by the same procedure are employed with ethyl 6,8-dibromooctanoate.

*Ethyl 8-chloro-6-hydroxyoctanoate* (XII).—To a suspension of 108 g. of aluminum chloride in 450 ml. of carbon tetrachloride is added dropwise, with vigorous stirring, 72 g. of ethyl δ-chloroformylvalerate. The temperature is maintained at 25° C. The cooling bath is removed and ethylene is passed in for a period of 2 hours. The reaction mixture is poured onto cracked ice, the organic layer separated, and the aqueous layer extracted with 200 ml. of chloroform. The combined organic extracts are dried over anhydrous sodium sulfate and the solvent removed in vacuo. The dark-colored oil remaining is dissolved in 200 ml. of 95% ethanol and maintained at 20° C. with stirring while a solution of 7.06 g. of sodium borohydride in 20 ml. of water is added dropwise. Concentrated ammonium hydroxide (40 ml.) is then added, the cooling bath is removed, and stirring is continued for 1 hour. The reaction mixture is poured into 500 ml. of water and extracted with two 150 ml. portions of ether. The combined ether extracts are washed with 50 ml. of 5% hydrochloric acid and dried over anhydrous sodium sulfate. The solvent is removed in vacuo and the oily residue distilled through a 6 inch Vigreaux column. A small forerun is collected, followed by the main fraction, 49–60 g. (59–72%), B.P. 121–123° C. (0.5 mm.), $n^{25}_D$ 1.4573; on redistillation, B.P. 121° C. (0.4 mm.), $n^{25}_D$ 1.4580.

*Ethyl 6,8-dichlorooctanoate* (XIII).—A solution of 29.2 g. of ethyl 8-chloro-6-hydroxyoctanoate (XII) in 28 ml. of anhydrous benzene is added dropwise with stirring to a solution of 18.5 g. of thionyl chloride in 14 ml. of benzene containing two drops of pyridine. The reaction mixture is then heated under gentle reflux for 1 hour, cooled, and shaken with 50 ml. of ice-water. The organic layer is separated, dried over anhydrous sodium sulfate and distilled in vacuo. A small forerun (4 g.) is collected, followed by the main fraction, 24.5 g. (77%), B.P. 100–103° C. (0.05 mm), $n^{26}_D$ 1.4600; on redistillation, B.P. 99.5–100° C. (0.05 mm.), $n^{25}_D$ 1.4603.

*6,8-dibenzylmercaptooctanoic acid* (XVI).—*Method A*.—To a solution of 12.4 g. of benzylmercaptan in 69 ml. of 10% alcoholic potassium hydroxide is added 14.9 g. of ethyl 6,8-dibromooctanoate. The mixture is stirred and heated under reflux in an atmosphere of nitrogen for 3 hours. The mixture is cooled in an ice-bath, 8 g. of 85% potassium hydroxide is added, and the mixture is stirred at room temperature for 17 hours. The reaction mixture is acidified with 6 N hydrochloric acid, diluted with 200 ml. of water and extracted with two 100 ml. portions of ether. The combined ether extracts are treated with iodoform reagent until a permanent brown color is produced (approximately 7 ml. required). The ether layer is washed with 100 ml. of 1% sodium thiosulfate solution and then extracted with two 100 ml. portions of 5% sodium hydroxide solution. The aqueous layer is acidified with 6 N hydrochloric acid and extracted with 100 ml. of ether. The ether extract is dried over anhydrous sodium sulfate and the solvent removed in vacuo. A viscous oil remained which solidifies when cooled and scratched. The solid material is crystallized from a mixture of benzene and n-hexane to give 14.3 g. (84.6%) of colorless needles, M.P. 68–69° C.; on recrystallization from benzene-n-hexane, M.P. 68.5–69.5° C.

*Method B*.—To 150 ml. of absolute ethanol is added 5.06 g. of sodium. When all of the sodium has reacted, 27.3 g. of benzyl mercaptan and 24.1 g. of ethyl 6,8-dichlorooctanoate are added. The mixture is stirred and heated under reflux in an atmosphere of nitrogen for 14 hours. The reaction mixture is cooled to room temperature, and 11.2 g. of potassium hydroxide is added. When the latter has dissolved, stirring is stopped and the reaction mixture is allowed to stand at room temperature for 20 hours. The reaction mixture is poured into 200 ml. of water, acidified with 6 N hydrochloric acid and extracted with two 150 ml. portions of ether. The combined ether extracts are dried over anhydrous sodium sulfate and the solvent is then removed in vacuo. The viscous oil remaining is dissolved in 105 ml. of warm benzene and 400 ml. of hot Skelly B is added gradually. The clear solution is seeded with crystalline 6,8-dibenzylmercaptooctanoic acid and allowed to stand overnight in a refrigerator. The crystalline product is collected on a Büchner funnel and washed well with cold Skelly B. The yield of product is 31 g. (80%), M.P. 67.5–69° C.

*6,8-dimercaptooctanoic acid* (VII).—To a stirred solution of 6.9 g. of sodium in 700 ml. of liquid ammonia is added dropwise a solution of 38.8 g. of 6,2-dibenzylmercaptooctanoic acid in 75 ml. of toluene. Toward the end of the reaction, small pieces of sodium are added to maintain a permanent blue color. A total of 8.8 g. of sodium is employed. The ammonia is allowed to evaporate and 150 ml. of cold water is added to dissolve the solid residue. The organic layer is separated and discarded. The aqueous layer is made strongly acid with concentrated hydrochloric acid and extracted with three 50 ml. portions of chloroform. The combined organic extracts are dried over anhydrous sodium sulfate and the solvent is removed in vacuo. The oily residue is distilled under reduced pressure in an atmosphere of carbon dioxide. The total yield of 6,8-dimercaptooctanoic acid, B.P. 160–167° C. (0.7 mm.) is 17.0 g. (82%).

*DL-α-lipoic acid* (VIII).—Sodium (2.64 g.) is added in small portions to 400 ml. of liquid ammonia. This solution is stirred while a solution of 11.2 g. of 6,8-dibenzylmercaptooctanoic acid in 50 ml. of anhydrous ether is added dropwise during a 30 minute period. The blue color is discharged with ammonium chloride and the ammonia is allowed to evaporate. The solid residue is extracted with 100 ml. of water and 50 ml. of ether. The aqueous layer is acidified (pH<1) with 6 N hydrochloric acid and then extracted with three 50 ml. portions of chloroform. To the combined chloroform extracts is added 138 ml. of chloroform and 70 ml. of water. This mixture is stirred vigorously in an atmosphere of nitrogen while sufficient iodoform reagent (60 ml.) is added dropwise during a 90 minute period to give a permanent brown color. The organic layer is washed with 100 ml. of 1% sodium thiosulfate solution and dried over anhydrous sodium sulfate. The solvent is removed in vacuo and the yellow oil remaining is extracted with one 300 ml. portion and one 100 ml. portion of boiling Skelly B. The combined extracts are seeded with crystalline DL-α-lipoic acid and allowed to stand at room temperature overnight and then in a refrigerator for several hours. Large yellow crystals separate, M.P. 61–62° C. The yield of product was 4.85 g. (82%).

This application contains subject matter in common with my application Serial Nos. 442,418, 442,419 and 442,420, filed July 8, 1954.

I claim:

1. The method which comprises treating with an alkali metal borohydride an ester of the group consisting of 8-chloro-6-oxooctanoic lower alkyl esters, 8-bromo-6-oxooctanoic lower alkyl esters and 6-oxo-7-octenoic lower alkyl esters to reduce the 6-oxo group to hydroxyl, and treating the 6-hydroxyl compound thereby produced with a halogenating agent selected from the group consisting of inorganic acyl chlorides and bromides to replace the 6-hydroxyl with a halogen selected from the group consisting of chlorine and bromine.

2. The method which comprises heating an 8-chloro-6-oxooctanoic lower alkyl ester to split off hydrogen chloride, treating the 6-oxo-7-octenoic ester thereby produced with hydrogen bromide to form the 8-bromo-6-oxooctanoic ester, reducing the 6-oxo group thereof to hydroxyl with an alkali metal borohydride, and replacing the hydroxyl with bromine by treating with an inorganic acyl bromide brominating agent thereby producing a 6,8-dibromooctanoic ester.

References Cited in the file of this patent

UNITED STATES PATENTS

| | | |
|---|---|---|
| 2,530,348 | Britton et al. | Nov. 14, 1950 |
| 2,655,521 | Ladd et al. | Oct. 13, 1953 |
| 2,792,406 | Acker | May 14, 1957 |

OTHER REFERENCES

Frank et al.: J. Am. Chem. Soc. 68, 2103–2104 (1946).
Fieser and Fieser: "Organic Chemistry," copyright 1950, pages 117, 148, 349 and 363.
Bullock et al.: J. Am. Chem. Soc. 74, 1868 (1952).
Bullock et al.: J. Am. Chem. Soc. 74, 3455 (1952).